(12) United States Patent
Nutu et al.

(10) Patent No.: US 6,761,334 B1
(45) Date of Patent: Jul. 13, 2004

(54) AIRCRAFT PASSENGER SAFETY MODULE

(76) Inventors: Costica Nutu, 429 Ivan Pavlov, Laval, QC (CA), H7M 4J4; Pavel Nutu, 239 Denver Dr., Des Plaines, IL (US) 60018

(*) Notice: Subject to any disclaimer, the term of this patent is extended or adjusted under 35 U.S.C. 154(b) by 0 days.

(21) Appl. No.: 10/445,446

(22) Filed: May 28, 2003

(51) Int. Cl.⁷ .............................................. B64D 25/12
(52) U.S. Cl. .................. 244/140; 244/138 R; 244/139; 244/142; 244/120
(58) Field of Search ............................. 244/138 R, 139, 244/140, 142, 144, 120, 118.1, 118.2

(56) References Cited

U.S. PATENT DOCUMENTS

| | | | | |
|---|---|---|---|---|
| 3,107,887 A | * | 10/1963 | Dixon et al. ................. | 244/139 |
| 3,129,909 A | * | 4/1964 | Smith ........................... | 244/107 |
| 3,129,913 A | * | 4/1964 | Smith ........................... | 244/139 |
| 3,227,399 A | * | 1/1966 | Dastoli ........................... | 244/2 |
| 3,315,920 A | * | 4/1967 | Caughron ..................... | 244/139 |
| 3,508,727 A | * | 4/1970 | Willems ........................ | 244/140 |
| 3,625,461 A | * | 12/1971 | Guienne et al. ......... | 244/138 R |
| 3,833,192 A | * | 9/1974 | Vitack et al. ................ | 244/139 |
| 4,298,177 A | * | 11/1981 | Berlongieri .................. | 244/139 |
| 4,699,336 A | * | 10/1987 | Diamond ..................... | 244/140 |
| 5,031,860 A | * | 7/1991 | Ruiz et al. ................ | 244/118.5 |
| 5,110,071 A | * | 5/1992 | Hunter et al. ............. | 244/137.3 |
| 5,356,097 A | * | 10/1994 | Chalupa ....................... | 244/139 |
| 5,560,568 A | * | 10/1996 | Schmittle ...................... | 244/48 |
| 5,568,903 A | * | 10/1996 | Pena et al. ................... | 244/140 |
| 5,673,875 A | * | 10/1997 | Martin et al. ................ | 244/139 |
| 5,765,778 A | * | 6/1998 | Otsuka ......................... | 244/101 |
| 5,826,827 A | * | 10/1998 | Coyaso et al. ............... | 244/139 |
| 5,899,414 A | * | 5/1999 | Duffoo ......................... | 244/139 |
| 5,921,504 A | * | 7/1999 | Elizondo ..................... | 244/140 |
| 5,992,794 A | * | 11/1999 | Rotman et al. .......... | 244/17.17 |
| 6,213,427 B1 | * | 4/2001 | Mareska .................. | 244/118.5 |
| 6,338,456 B1 | * | 1/2002 | Cairo-Iocco et al. ........ | 244/139 |
| 6,382,563 B1 | * | 5/2002 | Chiu ............................ | 244/120 |
| 6,416,019 B1 | * | 7/2002 | Hilliard et al. .............. | 244/139 |
| 6,494,404 B1 | * | 12/2002 | Meyer ..................... | 244/118.2 |
| 6,497,389 B1 | * | 12/2002 | Rawdon et al. .......... | 244/138 R |
| 6,554,227 B2 | * | 4/2003 | Wolter ......................... | 244/140 |
| 6,557,801 B1 | * | 5/2003 | Gevay ......................... | 244/140 |
| 2003/0127565 A1 | * | 7/2003 | Haffen et al. ................ | 244/139 |

* cited by examiner

*Primary Examiner*—Charles T. Jordan
*Assistant Examiner*—Stephen A. Holzen

(57) ABSTRACT

An aircraft has a fuselage with a cockpit and a tail, and jet or propeller propulsion. The improved aircraft has a fuselage with one or more modules located between the cockpit and the tail. The modules include passenger seating, means to seal the modules, and means to detach the modules from the fuselage. One or more parachutes connect to the modules for use during an in-flight emergency, and the modules have a means to store the parachutes. Also, modules allow an airline to load passengers by groups onto an aircraft and to change the configuration of aircraft readily.

2 Claims, 3 Drawing Sheets

AIRCRAFT PASSENGER SAFETY MODULE

BACKGROUND OF THE INVENTION

1. Field of the Invention

The present invention relates to an aircraft passenger safety module for use in connection with evacuation of passengers from a disabled aircraft during flight. The aircraft passenger safety module has particular utility in connection with ejecting a module from an aircraft fuselage.

2. Description of the Prior Art

Aircraft passenger safety modules are desirable for removing passengers from a disabled aircraft. Air disasters end with impact of a disabled aircraft upon the earth. In some aircraft, the crew may eject from the cockpit or parachute to safety. Often, passengers survive the triggering event in flight only to perish at impact. Fewer passengers would perish if the passenger cabin of an aircraft detached from a disabled aircraft. A detached cabin would avoid the fuel and explosive risks in the remainder of the fuselage. Cargo parachutes support a loaded passenger cabin on a safe descent to the earth.

The use of parachute safety systems is known in the prior art. For example, U.S. Pat. No. 4,699,336 to Diamond discloses an airplane safety body passenger compartment. However, the Diamond '336 patent does not keep the tail upon the aircraft, and has further drawbacks of requiring the aircraft to attain stall speed to deploy the parachutes, having multiple parachutes, and lacking a separate cockpit module.

U.S. Pat. No. 5,356,097 to Chalupa discloses a segmented safety aircraft that drags passenger segments upon inclined rails. However, the Chalupa '097 patent does not use a single tail aircraft, not have free floating segments rather linked segments, and additionally does not have a separate cockpit segment.

Similarly, U.S. Pat. No. 5,826,827 to Coyaso et al. discloses an air chute safety system that stores parachutes vertically and uses the parachutes to descend safely an entire aircraft. However, the Coyaso '827 patent does not detach a separate passenger cabin, and cannot store parachutes horizontally.

Similarly, U.S. Pat. No. 6,224,018 to Hinestroza discloses an occupant protection system that partially envelops a passenger in a chair. However, the Hinestroza '018 patent does not have a parachute, and cannot protect multiple passengers.

Similarly, U.S. Pat. No. 5,921,504 to Elizondo discloses an aircraft passenger extraction system that extracts modules along rails within the fuselage. However, the Elizondo '504 patent does not retain the tail upon the aircraft, and cannot detach the passenger cabin directly from the fuselage.

Lastly, U.S. Pat. No. 5,979,829 to Nance et al. discloses an in-flight evacuation system that has parachutes contained within passenger seats. However, the Nance '829 patent does not have a parachute for the entire passenger cabin, and has the additional deficiency of a conveyor system to eject seats from doors in the aircraft.

While the above-described devices fulfill their respective, particular objectives and requirements, the aforementioned patents do not describe an aircraft passenger safety module that allows ejecting a module from an aircraft fuselage. The Diamond '336 patent makes no provision for detaching the passenger cabin at flying speed. The Chalupa '097 patent calls for a double tailed aircraft and rails beneath the passenger modules. The Coyaso '827 patent makes no provision to detach the passenger cabin from the aircraft. The Hinestroza '018 patent does not protect more than one passenger and lacks a parachute. The Elizondo '504 patent does not eject the modules away from the aircraft. And the Nance '829 patent lacks a parachute for the entire passenger cabin.

Therefore, a need exists for a new and improved aircraft passenger safety module that can be used for ejecting a module from an aircraft fuselage. In this regard, the present invention substantially fulfills this need. In this respect, the aircraft passenger safety module according to the present invention substantially departs from the conventional concepts and designs of the prior art, and in doing so provides an apparatus primarily developed for the purpose of ejecting a module from an aircraft fuselage.

SUMMARY OF THE INVENTION

In view of the foregoing disadvantages inherent in the known types of parachute safety systems now present in the prior art, the present invention provides an improved aircraft passenger safety module, and overcomes the above-mentioned disadvantages and drawbacks of the prior art. As such, the general purpose of the present invention, which will be described subsequently in greater detail, is to provide a new and improved aircraft passenger safety module and method which has all the advantages of the prior art mentioned heretofore and many novel features that result in a aircraft passenger safety module which is not anticipated, rendered obvious, suggested, or even implied by the prior art, either alone or in any combination thereof.

To attain this, the present invention essentially comprises an aircraft that has a fuselage with a cockpit at the front and a tail at the rear, and jet or propeller propulsion. The improvement to the aircraft involves a fuselage having one or more modules located between the cockpit and the tail. The modules include conventional seating for passengers, means to seal the modules, means to detach the modules from the fuselage. One or more parachutes connect to the modules for use during an in-flight emergency of the aircraft, and the modules have a means to store the parachutes. In an emergency, the crew would enter the passenger module then send a conmmand to the module. The module would eject from the fuselage and the parachutes would deploy to slow the descent of the module to the earth.

Modules allow an airline to load passengers by groups onto an aircraft and to change the configuration of aircraft readily. An airline would board passengers into a module at a terminal. Equipment would then placed the module containing passengers upon a fuselage. Airlines may customize the interior of modules both in decor and seat configuration. An airline would then change modules between aircaft as needed.

There has thus been outlined, rather broadly, the more important features of the invention in order that the detailed description thereof that follows may be better understood and in order that the present contribution to the art may be better appreciated.

The invention may also include a watertight module with hermetic seals to the fuselage and to the doors, an emergency beacon and motor carried in the module, and a cushion located beneath the module for landing. A watertight airbag functions as a cushion and a float. The module may have side-mounted fins as a cushion and for stability of the module. Ejectors release the module from the fuselage using hydraulic or explosive devices. A chamber above the passengers stores the parachutes for deployment in an emergency. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and the scope of the present invention.

It is therefore an object of the present invention to provide a new and improved aircraft passenger safety module that has all of the advantages of the prior art parachute safety systems and none of the disadvantages.

It is another object of the present invention to provide a new and improved aircraft passenger safety module that may be easily and efficiently manufactured and marketed.

An even further object of the present invention is to provide a new and improved aircraft passenger safety module that has a low cost of manufacture with regard to both materials and labor, and which accordingly is then susceptible of low prices of sale to the consuming public, thereby making such aircraft passenger safety module economically available to the buying public.

Still another object of the present invention is to provide a new aircraft passenger safety module that provides in the apparatuses and methods of the prior art some of the advantages thereof, while simultaneously overcoming some of the disadvantages normally associated therewith.

Even still another object of the present invention is to provide an aircraft passenger safety module for ejecting a module from an aircraft fuselage. This allows a passenger module to detach from a disabled aircraft.

Still yet another object of the present invention is to provide an aircraft passenger safety module for ejecting a module from an aircraft fuselage. This makes it possible to land the module on land or water.

Still yet another object of the present invention is to provide an aircraft passenger safety module for ejecting a module from an aircraft fuselage. This makes it possible to interchange modules between aircraft as desired by airlines.

Still yet another object of the present invention to provide a new and improved method of saving passengers from a disabled aircraft and returning them safely to the earth by these steps: 1) constructing an aircraft with a detachable module for passengers, 2) equipping the module with one or more parachutes located generally in the center of the module above the passengers, and 3) fitting the module with two or more ejectors on opposite ends of the module to separate the module from the aircraft.

Lastly, it is an object of the present invention to provide a new and improved method of assembling and loading an aircraft, the steps comprising, 1) constructing a fuselage having two wings and a tail, and a generally flat forward section, 2) building a cockpit module for flying the aircraft, 3) building a passenger module with seats, and 4) securing the cockpit module and the passenger module upon the flat section of the fuselage forming an aircraft of typical configuration. These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
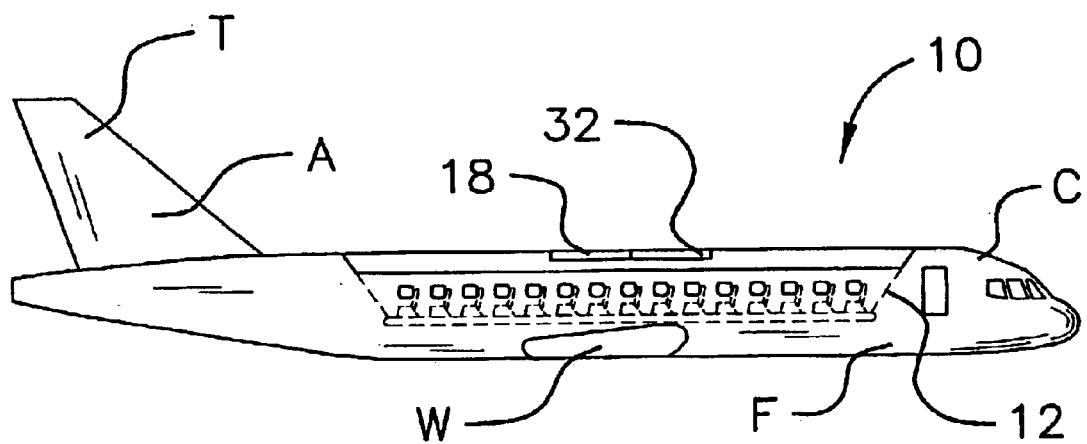
FIG. 1 is a side view of the preferred embodiment of the aircraft passenger safety module constructed in accordance with the principles of the present invention.

Referring now to the drawings, and particularly to FIGS. 1–4, a preferred embodiment of the aircraft passenger safety module of the present invention is shown and generally designated by the reference numeral 10.

In FIG. 1, a new and improved aircraft passenger safety module 10 of the present invention for ejecting a module from an aircraft fuselage is illustrated and will be described. An aircraft A has a fuselage F with a cockpit C denoting the front of the aircraft, a tail T opposite the cockpit C denoting the rear, two wings W extending generally perpendicular to the longitudinal axis of the aircraft A, and the aircraft passenger safety module 10 located between the cockpit C and the tail T. More particularly, the aircraft passenger safety module 10 contains the passenger cabin of the aircraft A, means to seal 12 the aircraft passenger safety module 10 to the fuselage F, means to detach 14 the aircraft passenger safety module 10 from the fuselage F upon command, and means to store 18 one or more parachutes 16. The aircraft passenger safety module 10 has tubular construction like a typical aircraft with an outer skin, ribs, and interior finish. The sealing means 12 joins the aircraft passenger safety module 10 to the fuselage F, minimizes adverse effects upon the aerodynamic profile of the aircraft A, and permits separation of the aircraft passenger safety module 10 from the aircraft A during an emergency. The sealing means 12 includes one or more doors 34 in each end of the aircraft passenger safety module 10 to communicate with the cockpit C and the tail T. The doors 34 hermetically seal to the aircraft passenger safety module 10, maintaining pressurization for the passengers. The storing means 18 has a central location, above the passengers in the aircraft passenger safety module 10. Two or more hatches 32, on the surface of the aircraft passenger safety module 10 and opposite the fuselage F, remain closed during flight to contain the parachutes 16.

Figure 2:
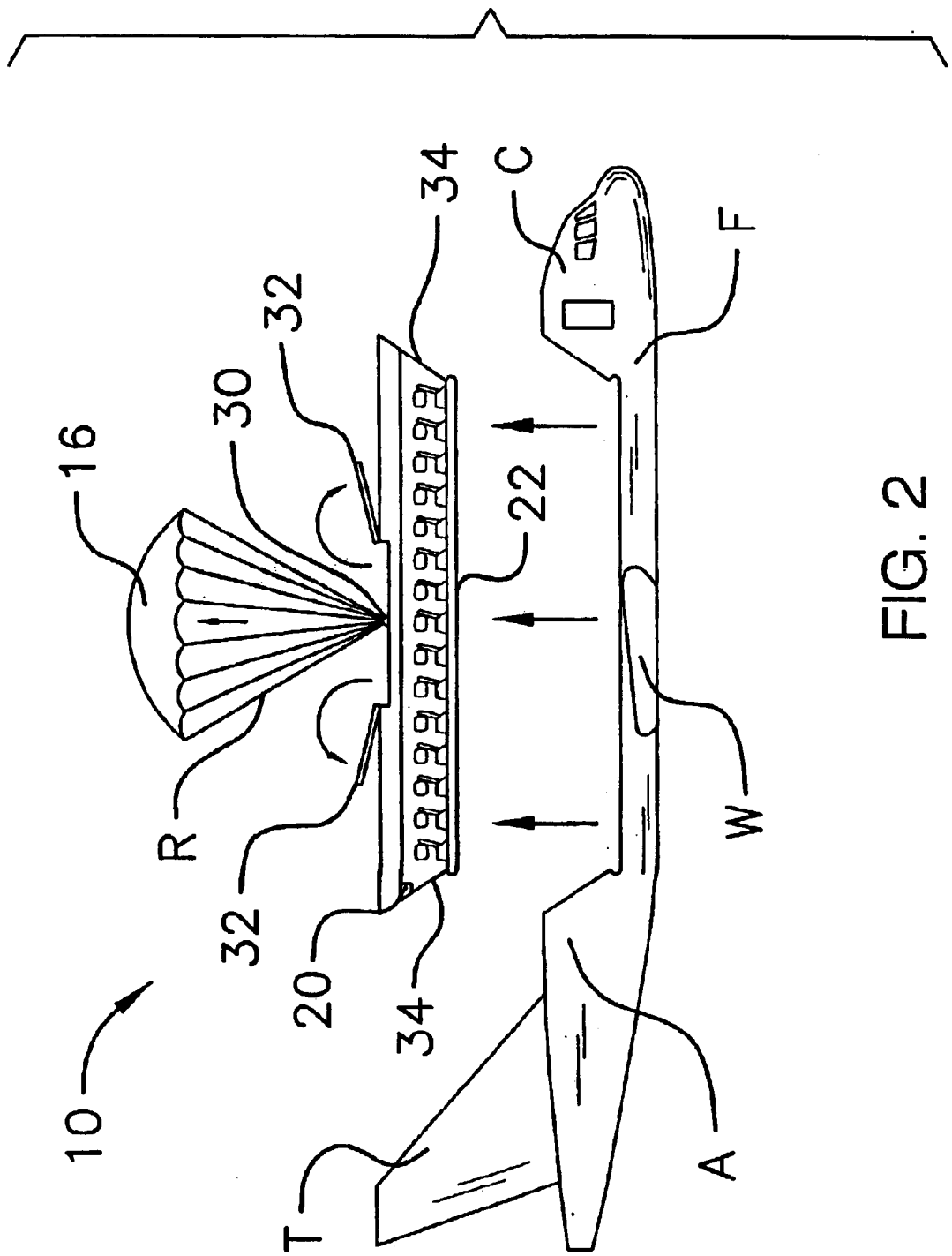
FIG. 2 is a side view of the aircraft passenger safety module of the present invention ejected from the fuselage.

In an emergency, the aircraft passenger safety module 10 detaches from the aircraft A as shown in FIG. 2. At the command of the crew, two or more ejectors 26 forcibly detach the aircraft passenger safety module 10 from the fuselage F. Then the hatches 32 swing open upon hinges. One hatch 32 swings towards the cockpit C and the other towards the tail T. One or more parachutes 16 extend from the aircraft passenger safety module 10 and inflate with air to slow the descent of the aircraft passenger safety module 10. A nylon tether 30 connects the parachute 16 risers R to the aircraft passenger safety module 10. Opposite the parachute 16, the aircraft passenger safety module 10 has a cushioning means 22. The cushioning means 22 occupies the length of the aircraft passenger safety module 10 and inflates upon crew conmmand.

Figure 3:
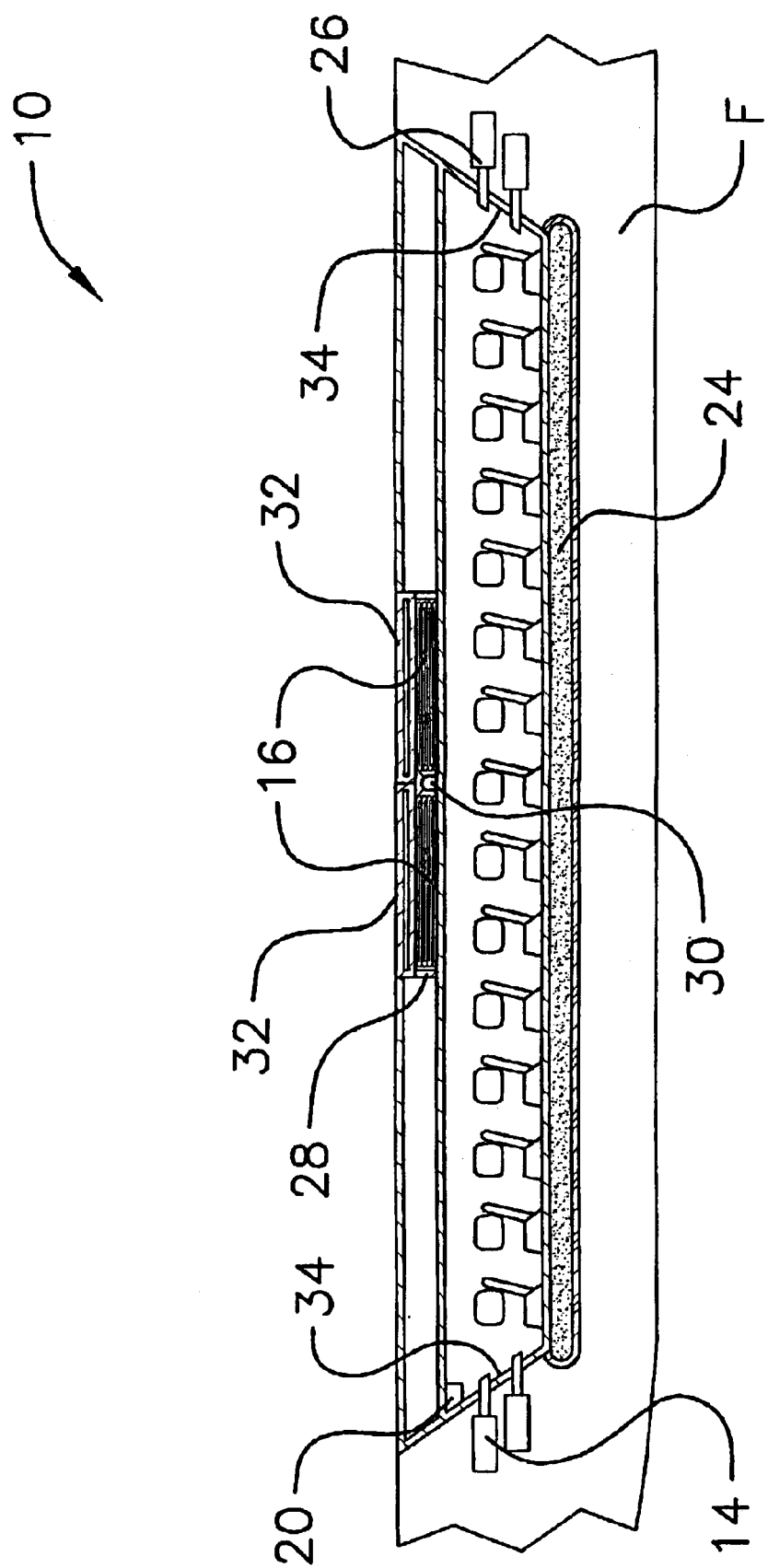
FIG. 3 is a detail view of the aircraft passenger safety module of the present invention.

In more detail, FIG. 3 illustrates the aircraft passenger safety module 10 and auxiliary components. Within the fuselage F, the aircraft passenger safety module 10 fits between the cockpit C and the tail T, maintaining the aerodynamic profile of the aircraft A. At each end of the aircraft passenger safety module 10, one or more ejectors 26 retain the aircraft passenger safety module 10 in the fuselage F until commanded to detach the aircraft passenger safety module 10. In the preferred embodiment, the ejectors 26 comprise hydraulic cylinders that retract pistons from the aircraft passenger safety module 10, thereby releasing it 10 from the aircraft A. The crew sends a command to the hydraulic cylinders to retract. In an alternate embodiment, the ejectors 26 take the form of explosive bolts. Upon crew command, the bolts would detonate and sever the connection between the aircraft passenger safety module 10 and the fuselage F.

Above the passengers, the aircraft passenger safety module 10 has a centrally located storing means 18. The storing means 18 forms a chamber 28 in the vicinity of the overhead bin area of the aircraft A. One or more parachutes 16 remain within the chamber 28, ready for deployment. The risers R of the parachutes 16 converge upon a tether 30. The nylon tether 30 connects to the aircraft passenger safety module 10. The tether 30 has sufficient strength to support the weight of a loaded aircraft passenger safety module 10. Hatches 32 cover the chamber 28 and open to the outside of the aircraft passenger safety module 10, away from the fuselage F. In the preferred embodiment, the hatches 32 have hinges that permit the hatches 32 to swing outwards from the center. One hatch 32 swings toward the cockpit C and the other swings towards the tail T. In an alternate embodiment, explosive bolts secure the hatches 32. As with the ejectors 26; upon crew command, these bolts would detonate and release the hatches 32 completely from the aircraft passenger safety module 10. With hatches 32 opened, the parachutes 16 deploy and fill to slow the descent of the aircraft passenger safety module 10.

Opposite the chamber 28, the aircraft passenger safety module 10 has a cushioning means 22. Running the length of the aircraft passenger safety module 10, the cushioning means 22 protects the aircraft passenger safety module 10 from impact upon landing. In the preferred embodiment, the cushioning means 22 is an airbag 24, stored deflated while the aircraft passenger safety module 10 remains joined to the fuselage F. When the aircraft passenger safety module 10 detaches, the airbag 24 inflates similar to emergency slides on existing aircraft A. Watertight, the airbag 24 cushions the aircraft passenger safety module 10 upon all landings and provides floatation for the aircraft passenger safety module 10 as well in a water landing. The aircraft passenger safety module 10 also carries a motor for use in water landings and a positioning signal emitter 20 to guide rescuers to the aircraft passenger safety module 10.

Figure 4:
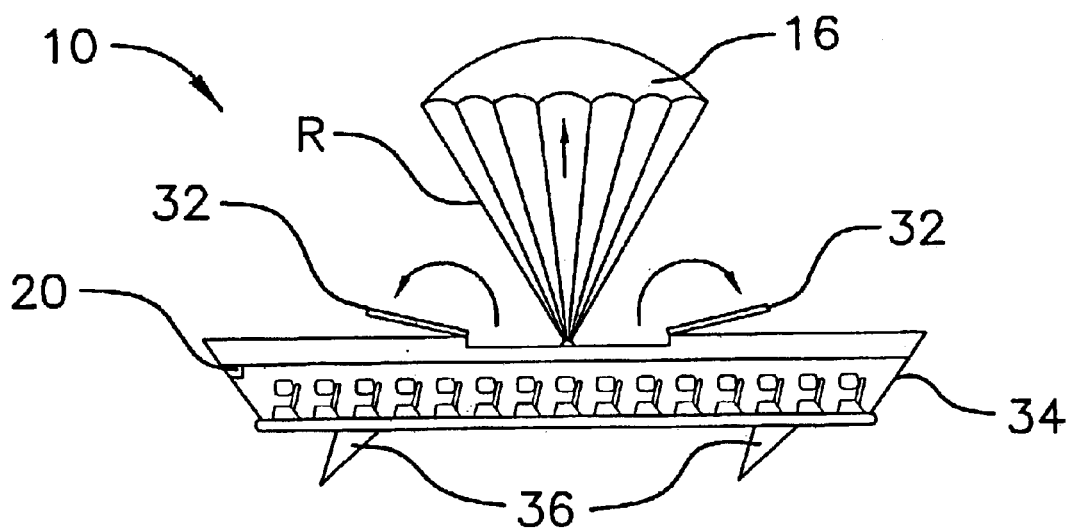
FIG. 4 is a side view of the aircraft passenger safety module with fins of the present invention.

FIG. 4 shows the aircraft passenger safety module 10 during descent Having a center-mounted parachute 16, the aircraft passenger safety module 10 may tip due to unequal passenger loading or aerodynamic forces. A tipping aircraft passenger safety module 10 may cause panic among the passengers. To maintain stability and a generally horizontal orientation, the aircraft passenger safety module 10 has one or more fins 36 that extend from the aircraft passenger safety module 10 and generally perpendicular to the longitudinal axis of the aircraft passenger safety module 10. The crew may retract the fins 36 if needed to stabilize the aircraft passenger safety module 10 during descent.

In use, it can now be understood that aircraft encounter flight emergencies at the risk of passengers. When the crew cannot safely land an aircraft, the crew exits the cockpit C and the tail T, passes through the doors 34, and enters the aircraft passenger safety module 10. Securing the doors 34, the crew informs the passengers of imminent detaching of the aircraft passenger safety module 10 from the aircraft A. The crew then sends a command to the ejectors 26 and the storing means 18. The ejectors 26 release the aircraft passenger safety module 10 from the fuselage F. The storing means 18 opens the hatches 32 and deploys one or more parachutes 16. The cushioning means 22 then inflates the airbag 24. As needed, the crew deploys one or more fins 36 to stabilize the aircraft passenger safety module 10 during descent. Upon landing, the cushioning means 22 reduces the impact felt by the passengers and provides floatation for the aircraft passenger safety module 10 if landed upon water. Automatically activated, the positioning signal emitter 20 provides the location of the module to rescuers by lights and radio signals. Rescuers then find and approach the aircraft passenger safety module 10 to rescue the passengers.

Alternatively, the aircraft passenger safety module 10 provides a new method of assembling and operating aircraft A. Conventional aircraft have a fuselage F assembled into a unit. Passengers and cargo embark and debark an aircraft A through doors 34. Controlled entry of passengers and cargo increases the time of the aircraft A at the gate. The aircraft passenger safety module 10 allows an airline to embark passengers in the aircraft passenger safety module 10 and then to place a loaded module upon an aircraft A, similar to a flat bed truck. In use, passengers would arrive at a gate. The airline directs the passengers into seats with an aircraft passenger safety module 10. Upon arrival of an aircraft A at the gate, the airline would remove an aircraft passenger safety module 10 from the aircraft A, expose the flat section of the fuselage F, and place the loaded aircraft passenger safety module 10 back upon the aircraft A. The aircraft A then departs the gate for takeoff.

While a preferred embodiment of the aircraft passenger safety module has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the tether may be made of heavy-duty plastic, fibers, composites, or similar material. Although ejecting a module from an aircraft fuselage has been described, it should be appreciated that the aircraft passenger safety module herein described is also suitable for transporting cargo.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable Modifications and equivalents may be resorted to, falling within the scope of the invention.

We claim:

1. In an aircraft having a fuselage with a cockpit at the fore end and a tail at the aft end, said aircraft having jet or propeller propulsion, wherein the improvement comprises:

said fuselage having one or more modules located between said cockpit and said tail including conventional seating for passengers, two opposite ends, and a means to seal said modules; means to detach said modules from said fuselage, one or more parachutes joined to said modules for use during an in-flight emergency of said aircraft, and a means to store said parachutes upon said modules; and a means to cushion said module from impact, said cushioning means attaches to said module proximate to said fuselage beneath said passengers;

wherein said cushioning means is two or more fins, located on opposite sides of said module perpendicular to the longitudinal axis of said module, whereby said fins stabilize said module during descent with said passengers seated upright.

2. In an aircraft having a fuselage with a cockpit at the fore end and a tail at the aft end, said aircraft having jet or propeller propulsion, wherein the improvement comprises:

said fuselage having one or more modules located between said cockpit and said tail including conventional seating for passengers, two opposite ends, and a means to seal said modules; means to detach said modules from said fuselage, one or more parachutes joined to said modules for use during an in-flight emergency of said aircraft, and a means to store said parachutes upon said modules;

wherein said module hermetically seals to said fuselage, said cockpit, and said tail; said module is watertight in the event of a water landing of said module; said module contains a motor to propel said module in the event of a water landing; and said fins retract into said module upon command of the crew of said aircraft.

* * * * *